United States Patent
Ebara et al.

[11] Patent Number: 6,127,303
[45] Date of Patent: Oct. 3, 2000

[54] PROCESS FOR PRODUCING OLEFIN POLYMERS, OLEFIN-POLYMERIZING CATALYST AND POLYPROPYLENE FOR BIAXIALLY ORIENTED FILM PRODUCED WITH SAID CATALYST

[75] Inventors: Takeshi Ebara, Ichihara; Koji Mizunuma, Kisarazu; Toshio Sasaki, Ichihara; Kazuki Wakamatsu, Sodegaura; Junichi Kimura, Toyonaka; Yoichi Obata, Ichihara, all of Japan

[73] Assignee: Sumitomo Chemical Company, Limited, Osaka, Japan

[21] Appl. No.: 08/901,165

[22] Filed: Jul. 28, 1997

Related U.S. Application Data

[63] Continuation of application No. 08/353,318, Dec. 5, 1994, abandoned.

[30] Foreign Application Priority Data

Dec. 7, 1993 [JP] Japan .................................. 5-306711
Apr. 21, 1994 [JP] Japan .................................. 6-083004

[51] Int. Cl.⁷ .................................................. B01J 31/00
[52] U.S. Cl. ......................... 502/125; 502/126; 502/127; 526/128.3; 526/128
[58] Field of Search .................................. 502/125, 126, 502/127; 526/125.3, 128

[56] References Cited

U.S. PATENT DOCUMENTS

| | | |
|---|---|---|
| 4,107,413 | 8/1978 | Giannini et al. . |
| 4,107,414 | 8/1978 | Giannini et al. . |
| 4,156,063 | 5/1979 | Giannini et al. . |
| 4,157,435 | 6/1979 | Toyota et al. . |
| 4,187,196 | 2/1980 | Giannini et al. . |
| 4,226,963 | 10/1980 | Giannini et al. . |
| 4,336,360 | 6/1982 | Giannini et al. . |
| 4,355,144 | 10/1982 | Shiga et al. . |
| 4,412,049 | 10/1983 | Shiga et al. . |
| 4,414,373 | 11/1983 | Shiga et al. . |
| 4,668,753 | 5/1987 | Kashiwa et al. . |
| 4,743,665 | 5/1988 | Sasaki et al. . |
| 4,952,649 | 8/1990 | Kioka et al. . |
| 4,971,937 | 11/1990 | Albizzati et al. . |
| 4,983,561 | 1/1991 | Sasaki et al. . |
| 5,100,981 | 3/1992 | Schreck et al. ........................ 526/351 |
| 5,449,738 | 9/1995 | Koura et al. ............................ 525/270 |
| 5,652,303 | 7/1997 | Ishimaru et al. ..................... 526/125.3 |

FOREIGN PATENT DOCUMENTS

| | | |
|---|---|---|
| 0045975 | 2/1982 | European Pat. Off. . |
| 20376084 | 7/1990 | European Pat. Off. . |
| 2-385765 | 9/1990 | European Pat. Off. . |
| 385765 | 9/1990 | European Pat. Off. . |
| B46-11027 | 3/1971 | Japan . |
| 54-94590 | 7/1979 | Japan . |
| 55-36203 | 3/1980 | Japan . |
| 56-41206 | 4/1981 | Japan . |

OTHER PUBLICATIONS

Japan Industrial Standards, JIS K 6758, 'Testing Methods of Polypropylenes', (1981).
Zambelli et al., Model Compounds and $^{13}C$ NMR Observation of Stereosequences of Polypropylene, Marcromolecules, 8: 687–688 (Sep.—Oct. 1975).

*Primary Examiner*—David W. Wu
*Assistant Examiner*—Ling-Siu Choi
*Attorney, Agent, or Firm*—Pillsbury Madison & Sutro LLP

[57] ABSTRACT

A catalyst system for polymerizing olefins is obtainable from (A) a solid component containing (A) magnesium, titanium and halogen and an electron donative compound which is an ether or ester; (B) an organoaluminum compound, and (C) at least two electron donative compounds, including an (α) and (β) compound, wherein the total amount (C) compounds is 0.01 to 1 mole per mole of (B).

10 Claims, 1 Drawing Sheet

PROCESS FOR PRODUCING OLEFIN POLYMERS, OLEFIN-POLYMERIZING CATALYST AND POLYPROPYLENE FOR BIAXIALLY ORIENTED FILM PRODUCED WITH SAID CATALYST

This is a continuation of application Ser. No. 08/353,318 now abandoned, filed on Dec. 5, 1994.

BACKGROUND OF THE INVENTION

1. Field of the Invention

The present invention relates to an olefin-polymerizing catalyst capable of forming in one polymerization system two homopolyolefins, each of said homopolyolefins being an isotactic polyolefin in which the disorder of monomer units alignment is in respective specified range. The present invention further relates to a process for producing an olefin polymer using said catalyst and a polypropylene produced by said process which is useful for production of a biaxially oriented film. More particularly, the present invention relates to a process for producing an olefin polymer excellent in stiffness and stretchability and successfully usable for formation of films, fibers, blow-molded articles, extrusion-molded articles, etc., an olefin-polymerizing catalyst used for production of such a polymer, a polypropylene for use in the production of a biaxially oriented film which can give a biaxially oriented film excellent in transparency and stiffness while retaining a particularly excellent stretchability, and a biaxially oriented film produced from said polypropylene.

2. Description of Related Art

Biaxially oriented films are extensively used as packaging materials because of their excellence in transparency, gloss, stiffness and water vapor barrier property. With the aim of improving the film properties, such as stiffness, of biaxially oriented film, highly crystalline homopolymers of propylene obtained with a high-stereospecificity catalyst have conventionally been used. However, such highly crystalline homopolymers of propylene have a fault that they are inferior in stretchability and apt to make troubles such as film breaking in the course of stretching. Thus, a variety of methods have so far been proposed for improving the stretchability of highly crystalline polypropylene. As one example of such proposals, copolymerization of propylene with a small amount of ethylene is known. Concretely speaking, JP-B-46-11027 has proposed a process for producing a polypropylene for use in production of films which comprises polymerizing propylene together with a very small amount of ethylene in the presence of a coordination catalyst and a hydrocarbon, hydrogen chloride or chlorinated hydrocarbon solvent so that one mole of the monomer unit in the resulting polymer becomes containing 0.01 mole or less of ethylene unit. Further, in JP-B-64-6211, there is proposed a process for producing a polypropylene improved in stretchability which comprises feeding propylene together with a small amount of ethylene into polymerization system using a catalyst consisting of an organoaluminum compound and titanium trichloride prepared by reducing titanium tetrachloride with an organoaluminum compound and further activating the reduced product by a treatment using a complex-forming agent, a treatment using an organoaluminum compound, a treatment using titanium tetrachloride or a combination thereof so that the resulting polymer comes to have an ethylene content of 0.1–1.0% by weight. Further, in JP-B-3-4371, there is proposed a process for producing a biaxially oriented polypropylene film excellent in transparency, stiffness and impact resistance by using a polypropylene of which ethylene content is 0.1–2% by mole and isotacticity is in a specified range. Any of these processes, however, have been unsatisfactory as a method for obtaining a polypropylene for a biaxially oriented film simultaneously having an excellent transparency and a high stiffness while retaining a good stretchability.

SUMMARY OF THE INVENTION

The object of the present invention is to provide an olefin-polymerizing catalyst capable of forming in one polymerization system two homopolyolefins, each of said homopolyolefins being an isotactic polyolefin in which stereoirregularity of monomer units is in respective specified range, a process for producing an olefin polymer using said catalyst, and a propylene for use in the production of a biaxially oriented film excellent in stretchability and having high transparency and stiffness.

In view of the above-mentioned state of things, the present inventors have conducted extensive studies to find that a polyolefin in which the stereoirregularity is in a specified range can be obtained by using a specified catalyst system, and that a biaxially oriented film simultaneously having high transparency and stiffness while retaining an excellent stretchability can be obtained from a polypropylene obtained by the use of said catalyst system which has a cold decalin-soluble fraction (23° C. decalin-soluble fraction) content falling in a specified range, shows a specified complex elastic molulus in a specified temperature range, and has a melt flow rate (referred to as MFR, too) falling in a specified range. Based on this finding, the present invention has been accomplished.

Thus, the present invention relates to a process for producing an olefin polymer which comprises homo- or co-polymerizing an olefin by the use of a olefin-polymerizing catalyst consisting of:

(A) a solid catalyst component containing magnesium, titanium, halogen and an electron donative compound as essential components, (B) an organoaluminum compound, and (C) at least two electron donative compounds including electron donative compound ($\alpha$) and electron donative compound ($\beta$), provided that 105° C. xylene-insoluble fraction of a homopolypropylene obtained by carrying out a polymerization using the electron donative compound ($\alpha$) together with the solid catalyst component and the organoaluminum compound shows a pentad stereoirregularity index (mmrr/mmmm) satisfying the following formula:

$$0 \leq mmrr/mmmm \leq 0.0068$$

and 105° C. xylene-insoluble fraction of a homopolypropylene obtained by carrying out a polymerization using the electron donative compound ($\beta$) together with the solid catalyst component and the organoaluminum compound shows a pentad stereoirregularity index satisfying the following formula:

$$0.0068 \leq mmrr/mmmm \leq 0.0320;$$

an olefin-polymerizing catalyst consisting of:

(A) a solid catalyst component containing magnesium, titanium, halogen and an electron donative compound as essential components, (B) an organoaluminum compound, and (C) at least two electron donative compounds including electron donative compound ($\alpha$) and electron donative compound (β), provided that 105° C. xylene-insoluble fraction of a homopolypropylene obtained by carrying out a polymerization using the electron donative compound (α) together with the solid catalyst component and the organoaluminum compound shows a pentad stereoirregularity index (mmrr/mmmm) satisfying the following formula:

$$0 \leq mmrr/mmmm \leq 0.0068$$

and 105° C. xylene-insoluble fraction of a homopolypropylene obtained by carrying out a polymerization using the electron donative compound (β) together with the solid catalyst component and the organoaluminum compound shows a pentad stereoirregularity index satisfying the following formula:

$$0.0068 \leq mmrr/mmmm \leq 0.0320;$$

and a polypropylene for use in the production of a biaxially oriented film obtained by carrying out a polymerization using said catalyst system, wherein:

(1) the content of 23° C. decalin-soluble fraction of the polypropylene is in the range of from 3.0 to 10.0% by weight, (2) when a vibration of 110 Hz is applied to the polypropylene, the polypropylene shows a complex elastic modulus of $1.0 \times 10^9$ dynes/cm$^2$ at a temperature falling in the range of from 134° C. to 152° C., and (3) melt flow rate (MFR) of the polypropylene at 230° C. is in the range of from 0.5 to 10.0 g/10 minutes.

Further, the present invention relates also to a biaxially oriented film obtained by subjecting said polypropylene for use in the production of biaxially oriented film to a stretching processing.

Next, the present invention is explained below in more detail.

The catalyst system used for production of the polyolefin of the present invention consists of (A) a solid catalyst component containing magnesium, titanium, halogen and electron donative component as essential components, (B) an organoaluminum compound and (C) an electron donative component.

(a) Solid catalyst component (A)

As the solid catalyst component (A) of the present invention containing magnesium, titanium, halogen and an electron donative compound as essential components, those generally called titanium-magnesium complex catalysts can be used. Such solid catalyst component (A) can be obtained by contacting the following magnesium compound, titanium compound and electron donative compound mutually.

As the titanium compound used for the synthesis of solid catalyst component (A), for example, the titanium compounds represented by the following general formula:

wherein R$^1$ represents a hydrocarbon group having 1–20 carbon atoms, X represents a halogen atom, and a represents a number satisfying $0 \leq a \leq 4$, can be referred to. More specifically, titanium tetrahalide compounds such as titanium tetrachloride, titanium tetrabromide, titanium tetraiodide and the like, alkoxytitanium trihalide compounds such as methoxytitanium trichloride, ethoxytitanium trichloride, butoxytitanium trichloride, phenoxytitanium trichloride, ethoxytitanium tribromide and the like, dialkoxytitanium dihalide compounds such as dimethoxytitanium dichloride, diethoxytitanium dichloride, dibutoxytitanium dichloride, diphenoxytitanium dichloride, diethoxytitanium dibromide and the like, trialkoxytitanium halide compounds such as trimethoxytitanium chloride, triethoxytitanium chloride, tributoxytitanium chloride, triphenoxytitanium chloride, triethoxytitanium bromide and the like, and tetraalkoxytitanium compounds such as tetramethoxytitanium, tetraethoxytitanium, tetrabutoxytitanium, tetraphenoxytitanium and the like can be referred to. These titanium compounds may be used either in the form of a single compound or in the form of a mixture of two or more compounds. Further, if desired, these titanium compounds may be used after dilution with a hydrocarbon or halogenated hydrocarbon compound or the like.

As the magnesium compound used in the synthesis of solid catalyst component (A), reductive magnesium compounds having a magnesium-carbon bond or a magnesium-hydrogen bond and non-reductive magnesium compounds can be used. Specific examples of the reductive magnesium compound include dimethylmagnesium, diethylmagnesium, dipropylmagnesium, dibutylmagnesium, dihexylmagnesium, butylethylmagnesium, ethylmagnesium chloride, butylmagnesium chloride, hexylmagnesium chloride, butylethoxymagnesium, butylmagnesium hydride and the like. If desired, these reductive magnesium compounds may be used in the form of a complex compound with an organoaluminum compound. On the other hand, specific examples of the non-reductive magnesium compounds include magnesium dihalide compounds such as magnesium dichloride, magnesium dibromide, magnesium diiodide and the like; alkoxymagnesium halide compounds such as methoxymagnesium chloride, ethoxymagnesium chloride, butoxymagnesium chloride, isopropoxymagnesium chloride, phenoxymagnesium chloride and the like; dialkoxymagnesium compounds such as diethoxymagnesium, dibutoxymagnesium, diisopropoxymagnesium, diphenoxymagnesium and the like; and magnesium carboxylates such as magnesium laurate, magnesium stearate and the like. If desired, said non-reductive magnesium compound may be a compound synthesized from a reductive magnesium compound according to a known method either previously or at the time of preparation of the solid catalyst component.

As the electron donative compound used in the synthesis of solid catalyst component (A), oxygen-containing electron donative compounds such as alcohols, phenols, ketones, aldehydes, carboxylic acids, esters of organic and inorganic acids, ethers, acid amides, acid anhydrides and the like; nitrogen-containing electron donative compounds such as ammonia, amines, nitriles, isocyanates and the like; etc. can be referred to. Of these electron donative compounds, esters of organic and inorganic acids and ethers are preferred.

As the ester of organic acid, esters of mono- and polycarboxylic acids can be used preferably, of which examples include esters of aliphatic carboxylic acids, esters of olefinic carboxylic acids, esters of alicyclic carboxylic acids and esters of aromatic carboxylic acids. Specific examples thereof are methyl acetate, ethyl acetate, phenyl acetate, methyl propionate, ethyl propionate, ethyl butyrate, ethyl valerate, methyl acrylate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, monoethyl phthalate, dimethyl phthalate, methyl ethyl phthalate, diethyl phthalate, di-n-propyl phthalate, diisopropyl phthalate, di-n-butyl phthalate, diisobutyl phthalate, di-n-octyl phthalate, diphenyl phthalate and the like.

As the esters of inorganic acid, the silicon compounds represented by the following general formula:

$$R^2{}_n Si(OR^3)_{4-n}$$

wherein $R^2$ represents a hydrocarbon group having 1–20 carbon atoms or a hydrogen atom, $R^3$ represents a hydrocarbon group having 1–20 carbon atoms, and n represents a number satisfying $0 \leq n \leq 4$, can be used preferably. Specific examples of said silicon compound include tetramethoxysilane, tetraethoxysilane, tetrabutoxysilane, tetraphenoxysilane, methyltrimethoxysilane, ethyltrimethoxysilane, butyltrimethoxysilane, isobutyltrimethoxysilane, t-butyltrimethoxysilane, isopropyltrimethoxysilane, cyclohexyltrimethoxysilane, phenyltrimethoxysilane, vinyltrimethoxysilane, dimethyldimethoxysilane, diethyldimethoxysilane, dipropyldimethoxysilane, propylmethyldimethoxysilane, diisopropyldimethoxysilane, dibutyldimethoxysilane, diisobutyldimethoxysilane, di-t-butyldimethoxysilane, butylmethyldimethoxysilane, butylethyldimethoxysilane, t-butylmethyldimethoxysilane, hexylmethyldimethoxysilane, hexylethyldimethoxysilane, dodecylmethyldimethoxysilane, dicyclopentyldimethoxysilane, cyclopentylmethyldimethoxysilane, cyclopentylethyldimethoxysilane, cyclopentylisopropyldimethoxysilane, cyclopentylisobutyl-dimethoxysilane, cyclopentyl-t-butyldimethoxysilane, dicyclohexyldimethoxysilane, cyclohexylmethyldimethoxysilane, cyclohexylethyldimethoxysilane, cyclohexylisopropyldimethoxy-silane, cyclohexylisobutyldimethoxysilane, cyclohexyl-t-butyldimethoxysilane, diphenyldimethoxysilane, phenylmethyldimethoxysilane, vinylmethyldimethoxysilane, methyltriethoxysilane, ethyltriethoxysilane, butyltriethoxysilane, isobutyltriethoxysilane, t-butyltriethoxysilane, isopropyltriethoxysilane, cyclohexyltriethoxysilane, phenyltriethoxysilane, vinyltriethoxysilane, dimethyldiethoxysilane, diethyldiethoxysilane, dipropyldiethoxysilane, propylmethyldiethoxysilane, diisopropyldiethoxysilane, dibutyldiethoxysilane, diisobutyldiethoxysilane, di-t-butyldiethoxysilane, butylmethyldiethoxysilane, butylethyldiethoxysilane, t-butylmethyldiethoxysilane, hexylmethyldiethoxysilane, hexylethyldiethoxysilane, dodecylmethyldiethoxysilane, dicyclopentyldiethoxysilane, dicyclohexyldiethoxysilane, cyclohexylmethyldiethoxysilane, cyclohexylethyldiethoxysilane, diphenyldiethoxysilane, phenylmethyldiethoxysilane, vinylmethyldiethoxysilane, ethyltriisopropoxysilane, vinyltributoxysilane, phenyltri-t-butoxysilane, 2-norbornanetrimethoxysilane, 2-norbornanetriethoxysilane, 2-norbornanemethyldimethoxysilane, trimethylphenoxysilane, methyltriallyloxysilane, and the like.

As the ethers, the dialkyl ether compounds such as those represented by the following general formula:

wherein $R^4$ to $R^7$ each represents linear or branched alkyl group having 1–20 carbon atoms, alicyclic group, aryl group, alkylaryl group or arylalkyl group, provided that $R^4$ to $R^7$ may be identical with or different from one another and each of $R^4$ and $R^5$ may also be a hydrogen atom, can be referred to. Specific examples of the ether compound include diethyl ether, dipropyl ether, diisopropyl ether, dibutyl ether, diamyl ether, diisoamyl ether, dineopentyl ether, dihexyl ether, dioctyl ether, methyl butyl ether, methyl isoamyl ether, ethyl isobutyl ether, 2,2-diisobutyl-1,3-dimethoxypropane, 2-isopropyl-2-isopentyl-1,3-dimethoxypropane, 2,2-bis (cyclohexylmethyl)-1,3-dimethoxypropane, 2-isopropyl-2-3,7-dimethyloctyl-1,3-dimethoxypropane, 2,2-diisopropyl-1,3-dimethoxypropane, 2-isopropyl-2-cyclohexylmethyl-1,3-dimethoxypropane, 2,2-dicyclohexyl-1,3-dimethoxypropane, 2-isopropyl-2-isobutyl-1,3-dimethoxypropane, 2,2-diisopropyl-1,3-dimethoxypropane, 2,2-dipropyl-1,3-dimethoxypropane, 2-isopropyl-2-cyclohexyl-1,3-dimethoxypropane, 2-isopropyl-2-cyclopentyl-1,3-dimethoxypropane, 2,2-dicyclopentyl-1,3-dimethoxypropane, 2-heptyl-2-pentyl-1,3-dimethoxypropane and the like.

Among these electron donative compounds, the ester compounds are particularly preferred.

As the method for producing such solid catalyst component, for example, the methods disclosed in JP-B-52-39431, JP-B-52-36786, JP-A-54-94590, JP-A-55-36203, JP-A-56-41206, JP-A-57-63310, JP-A-57-59916, JP-A-58-83006, JP-A-61-218606, JP-A-1-319508, JP-A-3-706, etc. can be referred to.

These methods can be exemplified by the following:

(1) a method of reacting a liquid magnesium compound or a complex compound consisting of a magnesium compound and an electron donative compound with a depositing agent and thereafter treating the reaction product with a titanium compound or a combination of titanium compound and electron donative compound;

(2) a method of treating a solid magnesium compound or a complex compound consisting of a solid magnesium compound and an electron donative compound with a titanium compound or a combination of titanium compound and electron donative compound;

(3) a method of reacting a liquid magnesium compound with a liquid titanium compound in the presence of an electron donative compound and thereby depositing a solid titanium composite compound;

(4) a method of further treating the reaction product obtained by (1), (2) or (3) with a titanium compound or a combination of electron donative compound and titanium compound;

(5) a method of reducing an alkoxytitanium compound with an organomagnesium compound such as Grignard reagent or the like in the presence of an organic silicon compound having a Si—O bond to obtain a solid product, followed by treating said solid product with an ester compound, an ether compound and titanium tetrachloride;

(6) a method of mutually contacting and reacting a metal oxide, dihydrocarbylmagnesium and a halogen-containing alcohol to obtain a product, followed by treating or not treating the product with a halogenating agent and then contacting the product with an electron donative compound and a titanium compound;

(7) a method of treating or not treating a magnesium compound such as a magnesium salt of organic acid, alkoxymagnesium or the like with a halogenating agent followed by contacting the magnesium compound with an electron donative compound and a titanium compound; and (8) a method of treating the compound obtained in (1) to (7) with any one of halogen, halogen compound and aromatic hydrocarbon.

Among these methods for synthesizing a solid catalyst, the methods (1) to (5) are preferred, and the method (5) is particularly preferred.

Although such solid catalyst component (A) can be used in itself alone, it may also be used after impregnation into a porous material such as inorganic oxides, organic polymers and the like, if desired. As said porous inorganic oxide, $SiO_2$, $Al_2O_3$, MgO, $TiO_2$, $ZrO_2$, $SiO_2$—$Al_2O_3$ composite oxide, MgO—$Al_2O_3$ composite oxide, MgO—$SiO_2$—$Al_2O_3$ composite oxide and the like can be referred to. As said porous organic polymer, polystyrene type, polyacrylic ester type, polyacrylonitrile type, polyvinyl chloride type, and polyolefin type of polymers can be referred to, of which specific examples include polystyrene, styrene-divinyl-benzene copolymer, styrene-n,n'-alkylenedimethacrylamide copolymer, styrene-ethylene glycol dimethyl methacrylate copolymer, polyethyl acrylate, methyl acrylate-divinyl-benzene copolymer, ethyl acrylate-divinylbenzene copolymer, polymethyl methacrylate, methyl methacrylate-divinylbenzene copolymer, polyethyleneglycol dimethyl methacrylate, polyacrylonitrile, acrylonitrile-divinylbenzene copolymer, polyvinyl chloride, polyvinylpyrrolidine, polyvinylpyridine, ethylvinylbenzene-divinylbenzene copolymer, polyethylene, ethylene-methyl acrylate copolymer, polypropylene and the like.

Of these porous materials, $SiO_2$, $Al_2O_3$ and styrene-divinylbenzene copolymer are preferred.

(b) Organoaluminum Compound (B)

The organoaluminum compounds which can be used as component (B) of the present invention are those having at least one Al-carbon bond in one molecule.

Typical organoaluminum compounds of the present invention are represented by the following general formulas:

$$R^9R^{10}Al—O—AlR^{11}R^{12}$$

wherein $R^8$ to $R^{12}$ each represents a hydrocarbon group having 1–8 carbon atoms, provided that $R^8$ to $R^{12}$ may be identical with or different from one another, Y represents halogen, hydrogen or alkoxy group, and m represents a number satisfying $2 \leq m \leq 3$. Specific examples of such organoaluminum compound include trialkylaluminums such as triethylaluminum, triisobutylaluminum, trihexylaluminum and the like, dialkylaluminum hydrides such as diethylaluminum hydride, diisobutylaluminum hydride and the like, mixtures of a trialkylaluminum and a dialkylaluminum halide such as mixture of triethylaluminum and diethylaluminum chloride, and alkylalumoxanes such as tetraethyldialumoxane, tetrabutyldialumoxane and the like.

Of these organoaluminum compounds, preferred are trialkylaluminums, mixtures of a trialkylaluminum and a dialkylaluminum halide and alkylalumoxanes, and particularly preferred are triethylaluminum, triisobutylauminum, mixture of triethylaluminum and diethylaluminum chloride, and tetraethyldialumoxane.

(c) Electron Donative Compound (C)

As the electron donative compound (C) of the present invention, at least two electron donative compounds including electron donative compound (α) and electron donative compound (β) are used, wherein said electron donative compounds (α) and (β) satisfy the following conditions. Thus, 105° C. xylene-insoluble fraction of a homopolypropylene obtained by carrying out polymerization using electron donative compound (α) together with the above-mentioned solid catalyst component (A) and organoaluminum compound (B) shows a pentad stereoirregularity index (mmrr/mmmm) satisfying the following condition:

$$0 \leq mmrr/mmmm \leq 0.0068,$$

preferably the following condition:

$$0.0004 \leq mmrr/mmmm \leq 0.0068,$$

and further preferably the following condition:

$$0.0004 \leq mmrr/mmmm \leq 0.0060,$$

and 105° C. xylene-insoluble fraction of a homopolypropylene obtained by carrying out polymerization using electron donative compound (β) together with the above-mentioned solid catalyst component (A) and organoaluminum compound (B) shows a pentad stereoirregularity index satisfying the following condition:

$$0.0068 \leq mmrr/mmmm \leq 0.0320,$$

preferably the following condition:

$$0.0068 \leq mmrr/mmmm \leq 0.0200,$$

and further preferably the following condition:

$$0.0072 \leq mmrr/mmmm \leq 0.0140.$$

As used in the present invention, the term "105° C. xylene-insoluble fraction" means the weight (%) of a fraction measured according to the method of Kakugo et al. [Macromolecules, 21, 314–319 (1988)], namely by dissolving a polypropylene in xylene at 130° C., throwing sea sand into the resulting solution, cooling the mixture to 20° C., again heating the mixture, and measuring the weight (%) of a fraction which is not extracted at 105° C. and extracted in the temperature range exceeding 105° C. and not exceeding 130° C. On the other hand, the term "pentad stereoirregularity index" means peak intensity ratio of the pentad fraction mmrr (the peak appears at about 21.01 ppm when TMS standard is used) to the pentad fraction mmmm (the peak appears at about 21.78 ppm when TMS standard is used) in the pentamer unit of a polypropylene molecular chain as measured at 135° C., at 67.5 MHz, on a solution of polymer in o-dichlorobenzene containing 10% by weight of $C_6D_6$ (concentration of polymer=150 mg/3 ml) by means of $^{13}$C-NMR (EX-270, manufactured by Nippon Denshi K. K.) according to the paper of A. Zambelli et al. [Macromolecules, 13, 687–689 (1975)].

In the present invention, as the electron donative compound used for preparation of electron donative catalyst component (C), the same electron donative compounds as used in the preparation of solid catalyst component (A) can be used. Preferably, electron donative compound (α) and electron donative compound (β) are independently selected from the organic silicon compounds mentioned below.

As such organic silicon compounds, those represented by the following general formula:

wherein $R^2$ represents a hydrocarbon group having 1–20 carbon atoms or a hydrogen atom, $R^3$ represents a hydrocarbon group having 1–20 carbon atoms, and n represents a number satisfying 0≦n≦4, can be referred to. Specific examples of such organic silicon compound include the following:

tetramethoxysilane, tetraethoxysilane, tetrabutoxysilane, tetraphenoxysilane, methyltrimethoxysilane, ethyltrimethoxysilane, butyltrimethyoxysilane, isobutyltrimethoxysilane, t-butyltrimethoxysilane, isopropyltrimethoxysilane, cyclohexyltrimethoxysilane, phenyltrimethoxysilane, vinyltrimethoxysilane, dimethyldimethoxysilane, diethyldimethoxysilane, dipropyldimethoxysilane, propylmethyldimethoxysilane, diisopropyldimethoxysilane, dibutyldimethoxysilane, diisobutyldimethoxysilane, di-t-butyldimethoxysilane, butylmethyldimethoxysilane, butylethyldimethoxysilane, t-butylmethyldimethoxysilane, isobutylisopropyldimethoxysilane, t-butylisopropyldimethoxysilane, hexylmethyldimethoxysilane, hexylethyldimethoxysilane, dodecylmethyldimethoxysilane, dicyclopentyldimethoxysilane, cyclopentylmethyldimethoxysilane, cyclopentylethyldimethoxysilane, cyclopentylisopropyldimethoxysilane, cyclopentylisobutyl-dimethoxysilane, cyclopentyl-t-butyldimethoxysilane, dicyclohexyldimethoxysilane, cyclohexylmethyldimethoxysilane, cyclohexylethyldimethoxysilane, cyclohexylisopropyldimethoxy-silane, cyclohexylisobutyldimethoxysilane, cyclohexyl-t-butyldimethoxysilane, cyclohexylcyclopentyldimethoxysilane, cyclohexylphenyldimethoxysilane, diphenyldimethoxysilane, phenylmethyldimethoxysilane, phenylisopropyldimethoxysilane, phenylisobutyldimethoxysilane, phenyl-t-butyldimethoxysilane, phenylcyclopentyldimethoxysilane, vinylmethyldimethoxysilane, methyltriethoxysilane, ethyltriethoxysilane, butyltriethoxysilane, isobutyltriethoxysilane, t-butyltriethoxysilane, isopropyltriethoxysilane, cyclohexyltriethoxysilane, phenyltriethoxysilane, vinyltriethoxysilane, dimethyldiethoxysilane, diethyldiethoxysilane, dipropyldiethoxysilane, propylmethyldiethoxysilane, diisopropyldiethoxysilane, dibutyldiethoxysilane, diisobutyldiethoxysilane, di-t-butyldiethoxysilane, butylmethyldiethoxysilane, butylethyldiethoxysilane, t-butylmethyldiethoxysilane, hexylmethyldiethoxysilane, hexylethyldiethoxysilane, dodecylmethyldiethoxysilane, dicyclopentyldiethoxysilane, dicyclohexyldiethoxysilane, cyclohexylmethyldiethoxysilane, cyclohexylethyldiethoxysilane, diphenyldiethoxysilane, phenylmethyldiethoxysilane, vinylmethyldiethoxysilane, ethyltriisopropoxysilane, vinyltributoxysilane, phenyltri-t-butoxysilane, 2-norbornanetrimethoxysilane, 2-norbornanetriethoxysilane, 2-norbornanemethyldimethoxysilane, trimethylphenoxysilane, methyltriallyloxysilane, and the like.

Among the organic silicon compounds mentioned above, those preferably usable as electron donative compound (α) are, for example, organic silicon compounds represented by the following general formula:

$$R^{13}R^{14}Si(OR^{15})_2.$$

In this general formula, $R^{13}$ represents $C_3$–$C_{20}$ hydrocarbon group in which the carbon atom adjacent to Si is a secondary or tertiary carbon atom, and specific examples thereof include branched chain alkyl groups such as isopropyl, sec-butyl, t-butyl, t-amyl and the like, cycloalkyl groups such as cyclopentyl, cyclohexyl and the like, cycloalkenyl groups such as cyclopentenyl and the like, and aryl groups such as phenyl, tolyl and the like. In the general formula, $R^{14}$ represents $C_1$–$C_{20}$ hydrocarbon group, of which specific examples include straight chain alkyl groups such as methyl, ethyl, propyl, butyl, pentyl and the like, branched chain alkyl groups such as isopropyl, sec-butyl, t-butyl, t-amyl and the like, cycloalkyl groups such as cyclopentyl, cyclohexyl and the like, cycloalkenyl groups such as cyclopentenyl and the like, and aryl groups such as phenyl, tolyl and the like. In the general formula, $R^{15}$ represents $C_1$–$C_{20}$ hydrocarbon group, and preferably $C_1$–$C_5$ hydrocarbon group.

Specific examples of the organic silicon compound which can be used as such electron donative compound include the following:

diisopropyldimethoxysilane, diisobutyldimethoxysilane, di-t-butyldimethoxysilane, t-butylmethyldimethoxysilane, isobutylisopropyldimethoxysilane, t-butylisopropyl-dimethoxysilane, dicyclopentyldimethoxysilane, cyclopentylisobutyldimethoxysilane, cyclopentyl-t-butyldimethoxysilane, dicyclohexyldimethoxysilane, cyclohexylmethyldimethoxysilane, cyclohexylethyldimethoxysilane, cyclohexylisopropyldimethoxysilane, cyclohexylisobutyldimethoxysilane, cyclohexyl-t-butyldimethoxysilane, cyclohexylcyclopentyldimethoxysilane, cyclohexylphenyldimethoxysilane, diphenyldimethoxysilane, phenylmethyldimethoxysilane, phenylisopropyldimethoxysilane, phenylisobutyldimethoxysilane, phenyl-t-butyldimethoxysilane, phenylcyclopentyldimethoxysilane, diisopropyldiethoxysilane, diisobutyldiethoxysilane, di-t-butyldiethoxysilane, t-butylmethyldiethoxysilane, dicyclopentyldiethoxysilane, dicyclohexyldiethoxysilane, cyclohexylmethyldiethoxysilane, cyclohexylethyldiethoxysilane, diphenyldiethoxysilane, phenylmethyldiethoxysilane, 2-norbornanemethyldimethoxysilane and the like.

Among the organic silicon compounds mentioned above, those preferably usable as electron donative compound (β) are, for example, organic silicon compounds represented by the following general formula:

$$R^{16}R^{17}Si(OR^{18})_2$$

wherein $R^{16}$ represents a $C_1$–$C_{20}$ hydrocarbon group and particularly preferably a straight chain alkyl group such as methyl, ethyl, propyl, butyl, pentyl and the like; $R^{17}$ represents a $C_1$–$C_5$ hydrocarbon group and particularly a hydrocarbon group having one carbon atom; and $R^{18}$ represents a $C_1$–$C_{20}$ hydrocarbon group and preferably a $C_1$–$C_5$ hydrocarbon group.

Specific examples of such organic silicon compound which can be used as electron donative compound (β) include the following:

dimethyldimethoxysilane, ethylmethyldimethoxysilane, propylmethyldimethoxysilane, butylmethyldimethoxysilane, pentylmethyldimethoxysilane, hexylmethyldimethoxysilane, heptylmethyldimethoxysilane, octylmethyldimethoxysilane, dodecylmethyldimethoxysilane and the like.

In the process for producing a polyolefin of the present invention, the method for feeding the catalyst components to a polymerization reactor is not particularly limited, so far as the catalyst components are fed in a moisture-free state in an inert gas such as nitrogen gas, argon gas or the like.

According to the polymerization process of the present invention, an olefin is polymerized in the presence of a catalyst consisting of a solid catalyst component (A), an organoaluminum compound (B) and an electron donative component comprising at least two electron donative compounds including electron donative compound ($\alpha$) and electron donative compound ($\beta$). In this polymerization reaction, there is no particular limitation except that mmrr/mmmm of a homopolypropylene obtained by carrying out the polymerization in the presence of a catalyst consisting of (A), (B) and a single component ($\beta$) must satisfy the following condition:

$$0 \leq mmrr/mmmm \leq 0.0068$$

and mmrr/mmmm of a homopolypropylene obtained by carrying out the polymerization in the presence of a catalyst consisting of (A), (B) and a single component ($\beta$) must satisfy the following condition:

$$0.0068 \leq mmrr/mmmm \leq 0.0320.$$

In the polymerization process of the present invention, an olefin is polymerized in the presence of the above-mentioned catalyst. If desired, a preliminary polymerization may be carried out before carrying out the main polymerization process. The preliminary polymerization is effected, for example, by feeding a small amount of olefin in the presence of solid catalyst component (A) and organoaluminum compound (B), and it is preferably carried out in the state of a slurry. As the solvent used for preparing the slurry, inert hydrocarbons such as propane, butane, isobutane, pentane, isopentane, hexane, heptane, octane, cyclohexane, benzene or toluene can be referred to. In preparing the slurry, a liquid olefin may be used, if desired, in place of a part or the whole of the inert hydrocarbon solvent.

In carrying out the preliminary polymerization, the amount of organoaluminum compound may be selected from such a wide range as from 0.5 to 700 moles per mole of titanium atom in the solid catalyst component. The amount of organoaluminum compound is preferably from 0.8 mole to 500 moles, and particularly preferably from 1 mole to 200 moles, both on the same basis as above.

The amount of olefin consumed in the preliminary polymerization is from 0.01 to 1,000 g, preferably from 0.05 to 500 g, and particularly preferably from 0.1 to 200 g, per gram of the solid catalyst component.

In carrying out the preliminary polymerization, the concentration of slurry is preferably from 1 to 500 g of solid catalyst component per liter of solvent, and particularly preferably from 3 to 300 g solid catalyst component per liter of solvent. The temperature of preliminary polymerization is preferably from −20° C. to 100° C., and particularly preferably from 0° C. to 80° C. In the process of the preliminary polymerization, the partial pressure of propylene in the gas phase is preferably from 0.01 to 20 kg/cm$^2$ and particularly preferably from 0.1 to 10 kg/cm$^2$, provided that this condition is not applicable to propylene which is in a liquid state at the pressure and temperature of preliminary polymerization. Although the period of time of the preliminary polymerization is not critical, it is usually from 2 minutes to 15 hours.

In carrying out the preliminary polymerization, the method for feeding solid catalyst component, organoaluminum compound and olefin may be any of a method of contacting a solid catalyst component with an organoaluminum compound and thereafter feeding olefin and a method of contacting a solid catalyst component with olefin and thereafter feeding an organoaluminum compound. The method for feeding olefin may be any of a method of portionwise feeding olefin while keeping the inner atmosphere of polymerization reactor at a prescribed pressure and a method of wholly feeding a prescribed quantity of olefin at the beginning. It is also possible to add a chain transfer agent such as hydrogen or the like in order to regulate molecular weight of the polymer formed.

In subjecting the solid catalyst component to a preliminary polymerization with a small amount of olefin in the presence of an organoaluminum compound, the preliminary polymerization may be carried out in the presence of an electron donative compound, if desired. The electron donative compound used for this purpose is a part or the whole of the above-mentioned electron donative catalyst component (C). Its amount is 0.01–400 moles, preferably 0.02–200 moles and particularly preferably 0.03–100 moles per mole of titanium atom present in the solid catalyst component, and is 0.003–5 moles, preferably 0.005–3 moles and particularly preferably 0.01–2 moles per mole of the organoaluminum compound.

In carrying out the preliminary polymerization, the method for feeding the electron donative compound is not particularly limited. Thus, an electron donative compound may be fed independently of an organoaluminum compound, or after a previous contact with an organoaluminum compound. The olefin used in the preliminary polymerization may be identical with or different from the olefin used in the main polymerization step which will be mentioned later.

After carrying out a preliminary polymerization in the above-mentioned manner or without carrying out the preliminary polymerization, a main polymerization of olefin can be effected in the presence of a polymerization catalyst consisting of the above-mentioned solid catalyst component (A), organoaluminum compound (B) and electron donative catalyst component (C).

The solid catalyst component, organoaluminum compound and electron donative catalyst component consisting of at least two electron donative compounds may be fed either independently of one another or after mutually contacting any two of them. Regarding the electron donative compounds ($\alpha$) and ($\beta$) as the electron donative catalyst components, it is allowable to use both of them at the time of preliminary polymerization or it is also allowable to use one of them in the preliminary polymerization and to use the other in the main polymerization or it is also allowable to use both of them firstly in the main polymerization.

In the main polymerization, the amount of the organoaluminum compound may be selected from such a wide range as from 1 mole to 1,000 moles per mole of titanium atom in the solid catalyst component. Particularly preferably, however, the amount of the organoaluminum compound is in the range of from 5 to 600 moles on the same basis as above.

In the main polymerization, the total amount of the electron donative catalyst component (C) is from 0.1 to 2,000 moles, preferably from 0.3 to 1,000 moles and particularly preferably from 0.5 to 800 moles per mole of titanium atom present in the solid catalyst component. The total amount of electron donative component (C) is from 0.001 to 5 moles, preferably from 0.005 to 3 moles and particularly preferably from 0.01 to 1 mole per mole of the organoaluminum compound.

The main polymerization can be effected at a temperature ranging from −30° C. to 300° C. and preferably from 20° C. to 180° C. Although there is no limitation upon the polymerization pressure, a pressure of from ordinary pressure to 100 kg/cm$^2$ and preferably from 25 about 2 to about 50 kg/cm$^2$ is usually adopted from the viewpoint of industrial and economical practicabilities. As the mode of polymerization, batch process and continuous process can both be adopted. A slurry polymerization process or a solution polymerization process using an inert hydrocarbon solvent such as propane, butane, isobutane, pentane, hexane, heptane, octane and the like, a bulk polymerization process using propylene keeping liquid at the polymerization temperature as a medium, and a gas phase polymerization process can also be practiced.

At the time of main polymerization, a chain transfer agent such as hydrogen and the like may be added for the purpose of regulating molecular weight of the formed polymer.

The olefins which can be used in the main polymerization are those having 3 or more carbon atoms. Specific examples of the olefin include propylene, butene-1, pentene-1, hexene-1, 3-methyl-butene-1, 3-methyl-pentene-1, 4-methyl-pentene-1, octene-1, decene-1, dodecene-1, cyclohexene and the like. Of these olefins, propylene and butene-1 are preferabe for use in homopolymerization, and mixed olefins consisting mainly of propylene or butene-1 are preferable for use in copolymerization. Of these olefin monomers, propylene is particularly preferred. In the copolymerization of the present invention, two or more kinds of olefin compounds selected from ethylene and the above-mentioned olefin compounds may be used in the form of a mixture. Compounds having a plurality of unsaturated bonds such as conjugated dienes and non-conjugated dienes can also be used in the copolymerization.

The first characteristic feature of the polypropylene used for production of the biaxially oriented film of the present invention consists in that it exhibits a good stretchability in the process of film-making. Further, the second characteristic feature thereof consists in that a biaxially oriented film obtained by biaxially stretching said polypropylene is excellent in transparency and stiffness.

The polypropylene produced according to the process of the present invention contains a specified quantity of 23° C. decalin-soluble fraction. The content of 23° C. decalin-soluble fraction in said polypropylene is in the range of from 3.0 to 10.0% by weight, preferably from 3.0 to 9.0% by weight and particularly preferably from 3.5 to 8.5% by weight. If the content of 23° C. decalin-soluble fraction in said polypropylene exceeds the above-specified upper limit, the biaxially oriented film prepared therefrom is insufficient in stiffness. If the content of 23° C. decalin-soluble fraction in said polypropylene is lower than the above-specified lower limit, the biaxially oriented film obtained therefrom is insufficient in stretchability.

The temperature at which the polypropylene of the present invention exhibits a complex elastic modulus of 1×10$^9$ dynes/cm$^2$ when a vibration of 110 Hz is applied to the polypropylene is in the range of from 134 to 152° C. and preferably from 137 to 149° C. If said temperature is higher than the above-specified upper limit, stretchability is insufficient. If said temperature is lower than the above-specified lower limit, stiffness of the biaxially oriented film is insufficient.

Melt flow rate (MFR) of the polypropylene of the present invention at 230° C. is in the range of from 0.5 to 10.0 g/10 minutes and preferably from 1.0 to 8.0 g/10 minutes. MFR is a parameter representing the average molecular weight of a polymer, and its greater value means a lower average molecular weight. If MFR of said polypropylene is higher than the above-specified upper limit, stretchability is not good. If MFR of the polypropylene is lower than the above-specified lower limit, flow property at the time of extrusion is not good to bring about undesirable results.

Into the polypropylene of the present invention, ethylene and α-olefins having 4 or more carbon atoms may be copolymerized unless the object of the present invention is damaged by their copolymerization.

Into the polypropylene of the present invention, a stabilizer, a slipper, an antistatic agent, an anti-blocking agent and the like may be incorporated, unless the object of the present invention is damaged by adding these additives. A variety of inorganic and organic fillers may also be added, unless the object of the present invention is damaged by their addition.

The polypropylene of the present invention is made into a film and subjected to a stretching processing usually in the following manner to give a biaxially oriented film. Thus, the propylene is melted in an extruder, and thereafter extruded from a T die and cooled and solidified by means of cooling rolls to give a sheet-form material. Subsequently, the sheet thus obtained is pre-heated and stretched in the longitudinal direction by means of a number of heating rolls, and then laterally stretched by means of a heating oven consisting of a pre-heating part, a stretching part and a heat-treating part, after which it is subjected to a corona treatment if desired, and finally wound up. Although the melting temperature of the polypropylene varies depending on molecular weight, the above treatment is usually carried out at a temperature of from 230° C. to 290° C. The temperature of longitudinal stretching is from 130° C. to 150° C., and the draw ratio in the longitudinal direction is usually from 4 to 6. The temperature of lateral stretching is from 150° C. to 165° C., and the draw ratio in the lateral direction is usually from 8 to 10.

The biaxially oriented polypropylene film produced in the above-mentioned manner is superior to prior biaxially oriented films in transparency and stiffness, while retaining a good stretchability.

DESCRIPTION OF THE PREFERRED EMBODIMENTS

Figure 1:
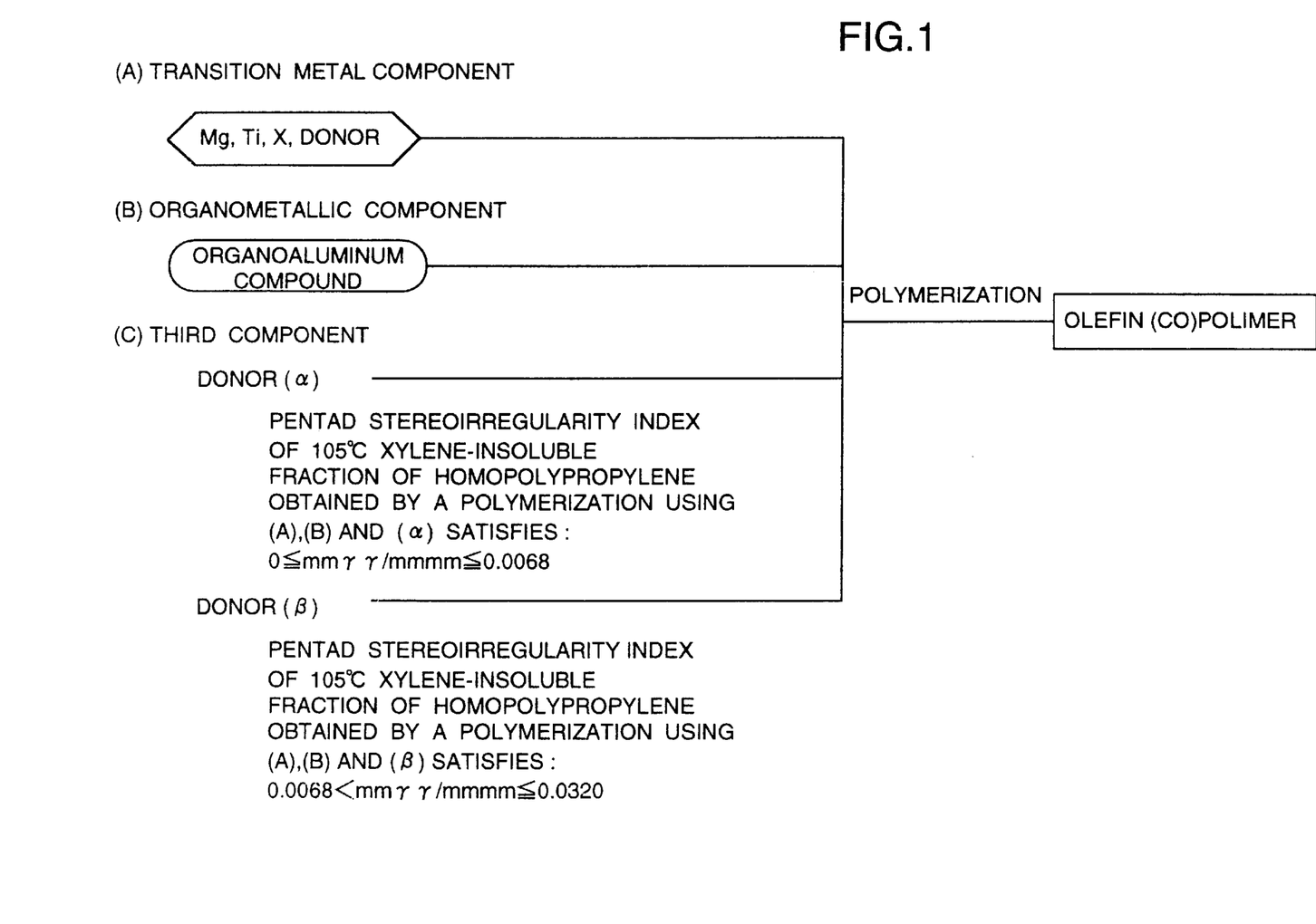
FIG. 1 is a flow chart for facilitating understanding of the present invention. This flow chart is a typical example of the embodiments of the present invention, and the present invention is by no means limited thereby.

Next, the present invention is explained in more detail with reference to the following examples. The invention is by no means limited by these examples, unless essentiality of the invention is exceeded. The characteristic properties referred to in the examples and comparative examples were measured in the following manner.

(1) 20° C. xylene-soluble fraction (referred to as CXS) content:

One gram of polymer powder was dissolved in 200 ml of boiling xylene, slowly cooled to 50° C., immersed in ice water and cooled with stirring to 20° C. and allowed to stand at 20° C. for 3 hours. The deposited polymer was filtered off. Xylene was evaporated off from the filtrate, the residue was dried at 60° C. under a reduced pressure, and the fraction soluble in 20° C. was recovered.

(2) Boiling heptane-insoluble fraction (referred to as II) content:

By means of Soxhlet extractor, 3 g of polymer powder was subjected to an extraction treatment with 100 ml heptane for 6 hours. After vaporizing off the heptane from the extract solution, the residue was dried under reduced pressure and the fraction soluble in boiling heptane was recovered.

(3) Intrinsic viscosity (referred to as [η]):

Measured in tetralin solvent at 135° C.

(4) Bulk density (referred to as BD):

Measured according to ASTM D-1865.

(5) Pentad stereoirregularity index (mmrr/mmmm) of 105° C. xylene-insoluble fraction:

Measured according to the method mentioned in the specification of the present invention.

(6) 23° C. decalin-soluble fraction content (% by weight)

Two grams of polypropylene was completely dissolved in 100 ml of boiling decalin, cooled to 23° C. and allowed to stand for more than 4 hours. The resulting mixture was separated into deposited matter and filtrate by filtration. The filtrate was evaporated to dryness, and the residue was dried at 120° C. under a reduced pressure and weighed.

(7) Temperature at which sample polymer shows a complex elastic modulus of $1 \times 10^9$ dynes/CM$^2$ when a vibration of 110 Hz is applied (T1) (unit: ° C.)

According to JIS K6758-81, a polypropylene was formed into a press sheet having a thickness of 0.25 mm, from which test pieces having a length of 40 mm, a width of 2 mm and a thickness of 0.25 mm were cut out. While applying a vibration of 110 Hz to the test piece with Automatic Dynamic Viscoelasticity Measuring Machine (RHEOBIBRON DV-II-EA, manufactured by Orientec Co., Ltd.), the temperature at which a complex elastic modulus of $1 \times 10^9$ dynes/cm$^2$ was shown was measured.

(8) Melt flow rate (MFR) (unit: g/10 minutes)

Measured according to JIS K7210, condition 14.

(9) Haze (unit: %)

Measured according to ASTM D1003.

(10) Young's modulus (unit: Kg/cm$^2$)

Test pieces having a width of 20 mm were cut out in the longitudinal direction (MD) on the one hand and in the lateral direction (TD) on the other hand. S—S curve was pictured by means of a tensile tester at a chuck distance of 60 mm and a tensile speed of 5 mm/minute, from which initial elastic modulus was determined.

(11) Stretchability

According to JIS K6758-81, a polypropylene was formed into a press sheet having a thickness of 500 μ, from which a sample of 90 mm×90 mm was cut out. The sample was biaxially oriented under the following conditions. A case that no good film was obtained due to uneven stretching or stretching cracking was expressed by defective stretchability (x) and a case that a good film was obtained was expressed by good stretchability ().

Stretching machine: Biaxial Stretching Tester manufactured by Toyo Seiki Co.

Temperature: 135° C.

Thermal inertia time: 3 minutes

Draw ratio: 5×5

Stretching speed: 5 m/minute.

EXAMPLE 1

(a) Synthesis of Organomagnesium Compound

After replacing the inner atmosphere of a 1,000 ml flask equipped with a stirrer, a reflux condenser, a dropping funnel and a thermometer with argon gas, 32.0 g of sliced metallic magnesium for Grignard reaction was thrown into the flask. The dropping funnel was charged with 120 g of butyl chloride and 500 ml of dibutyl ether, and about 30 ml of the mixture was dropped onto the magnesium in the flask to start a reaction. After starting the reaction, the mixture was continuously dropped for 4 hours at 50° C. After the dropping, the reaction was continued for an additional one hour at 60° C. Then, the content of the flask was cooled to room temperature, and the solid matter was filtered off. A part of the reacted solution was sampled out, the butylmagnesium chloride present in the solution was hydrolyzed with 1 N sulfuric acid, and the excessive sulfuric acid was back titrated with 1 N aqueous solution of sodium hydroxide to determine the concentration of butylmagnesium chloride, using phenolphthalein as an indicator. As the result, the concentration was 2.1 moles/liter.

(b) Synthesis of Solid Product

After replacing the inner atmosphere of a 500 ml flask equipped with a stirrer and a dropping funnel with argon gas, 290 ml of hexane, 7.7 g (23 mmoles) of tetrabutoxy-titanium and 75.0 g (360 mmoles) of tetraethoxysilane were thrown into the flask to prepare a homogeneous solution. Then, 181 ml of the solution of organomagnesium compound synthesized in (a) was slowly dropped into the flask from the dropping funnel over a period of 3.5 hours, while keeping the inner temperature of the flask at 5° C. After completing the dropping, the content of the flask was stirred at room temperature for an additional one hour and then separated into solid and liquid phases. The solid product was three times washed with each 300 ml portion of hexane and then three times with each 300 ml portion of toluene, after which 300 ml of toluene was added thereto.

A part of the solid product slurry was sampled out and its composition was analyzed to reveal that the solid product contained 2.1% by weight of titanium atom, 36.2% by weight of ethoxy group and 3.8% by weight of butoxy group. Concentration of the slurry was 0.125 g/ml.

(c) Synthesis of Ester-Treated Solid

The supernatant of the slurry (125 ml) was withdrawn, 45.8 ml (171 mmoles) of diisobutyl phthalate was added thereto and reacted at 95° C. for 30 minutes. After the reaction, the solid matter was separated from the liquid phase and twice washed with each 287 ml portion of toluene.

(d) Synthesis of Solid Catalyst Component (Activating Treatment)

After completing the washing treatment of (c), 74.5 ml of toluene, 2.9 ml (11 mmoles) of diisobutyl phthalate, 6.3 ml (37 mmoles) of butyl ether and 99 ml (0.90 mole) of titanium tetrachloride were introduced into the flask and reacted at 100° C. for 3 hours. After the reaction, the solid matter was separated from liquid phase and twice washed each 287 ml portion of toluene at the same temperature as above. Then, 74.5 ml of toluene, 6.3 ml (37 mmoles) of butyl ether and 50 ml (0.45 mole) of titanium tetrachloride were added and reacted at 100° C. for one hour. After the reaction, the solid matter was separated from liquid phase at that temperature, four times washed with each 287 ml portion of toluene, three times washed with each 287 ml portion of hexane, and dried under reduced pressure to obtain 46 g of a solid catalyst component.

The solid catalyst component thus obtained contained 2.2% by weight of titanium atom, 10.7% by weight of phthalic ester, 0.7% by weight of ethoxy group and 0.3% by weight of butoxy group.

(e) Polymerization of Propylene

After replacing the inner atmosphere of a stainless steel-made autoclave equipped with a stirrer and having a capacity of 3 liters with argon gas, 2.6 mmoles of triethylaluminum, 0.065 mmole of cyclohexylethyldimethoxysilane, 0.065 mmole of n-propylmethyldimethoxysilane and 8.7 mg of the solid catalyst component synthesized in (d) were charged, to which was fed hydrogen gas up to a partial pressure of 0.33 kg/cm$^2$. Then, after feeding 780 g of liquefied propylene, temperature of the autoclave was elevated to 80° C. and a polymerization was carried out at 80° C. for one hour. After the polymerization, the unreacted monomer was purged and the polymer formed was dried at 60° C. for 2 hours under a reduced pressure. Thus, 254 g of a polypropylene powder was obtained.

This means that the yield of polypropylene per gram of solid catalyst component (hereinafter, referred to as PP/Cat) was 29,200 (g/g). The proportion of 20° C. xylene-soluble fraction (CXS) was 1.6% by weight, and the proportion of boiling heptane-insoluble fraction (II) was 99.1% by weight, both based on total yield of the polymer. Intrinsic viscosity ([η]) of the polymer was 1.77, and bulk density of the polymer (BD) was 0.41 (g/ml). The content of 105° C. xylene-insoluble fraction was 78.5% by weight, and pentad stereoirregularity index (mmrr/mmmm) of the 105° C. xylene-insoluble fraction was 0.0060. The conditions and results of the polymerization are summarized in Table 1.

EXAMPLE 2
(a) Polymerization of Propylene
Propylene was polymerized in the same manner as in Example 1 (e), except that n-butylmethyldimethoxysilane was used in place of the n-propylmethyldimethoxysilane.
Conditions and results of the polymerization are summarized in Table 1.

EXAMPLE 3
(a) Polymerization of Propylene
Propylene was polymerized in the same manner as in Example 1 (e), except that n-hexylmethyldimethoxysilane was used in place of the n-propylmethyldimethoxysilane.
Conditions and results of the polymerization are summarized in Table 1.

EXAMPLE 4
(a) Polymerization of Propylene
Propylene was polymerized in the same manner as in Example 1 (e), except that dicyclopentyldimethoxysilane was used in place of the cyclohexylethyldiethoxysilane.
Conditions and results of the polymerization are summarized in Table 1.

Comparative Examples 1–5
(a) Polymerization of Propylene
Propylene was polymerized in the same manner as in Example 1 (e), except that one of cyclohexylethyldimethoxysilane, dicyclopentyldimethoxysilane, n-propylmethyldimethoxysilane, n-butylmethyldimethoxysilane and n-hexylmethyldimethoxysilane was used as a single substance in an amount of 0.130 mmole in place of the combination of two silane compounds.
Conditions and results of the polymerization are summarized in Table 1.

Comparative Examples 6–7
(a) Polymerization of Propylene
Propylene was polymerized in the same manner as in Example 1 (e), except that one of cyclohexylethyldimethoxysilane and n-propylmethyldimethoxysilane was used as a single substance in an amount of 0.065 mmole in place of the combination of two silane compounds.
Conditions and results of the polymerization are summarized in Table 1.

Comparative Example 8
(a) Polymerization of Propylene
Propylene was polymerized in the same manner as in Example 1 (e), except that 0.26 mmole of n-propylmethyldimethoxysilane only was used as a single substance in place of the combination of two silane compounds.
Conditions and results of the polymerization are summarized in Table 1.

EXAMPLE 5
(a) Polymerization of Propylene
Propylene was polymerized in the same manner as in Example 1 (e), except that cyclohexylethyldimethoxysilane was used in an amount of 0.026 mmole and n-propylmethyldimethoxysilane was used in an amount of 0.065 mmole.
Conditions and results of the polymerization are summarized in Table 1.

EXAMPLE 6
(a) Polymerization of Propylene
Propylene was polymerized in the same manner as in Example 1 (e), except that cyclohexylethyldimethoxysilane was used in an amount of 0.014 mmole, n-propylmethyldimethoxysilane was used in an amount of 0.035 mmole and triethylaluminum was used in an amount of 1.4 mmoles.
Conditions and results of the polymerization are summarized in Table 1.

EXAMPLE 7
(e) Preliminary Polymerization
A SUS-made autoclave equipped with a stirrer and having a capacity of 3 liters was charged with 1.5 liters of sufficiently dehydrated and deaerated n-hexane, 37.5 mmoles of triethylaluminum, 3.75 mmoles of cyclohexylethyldimethoxysilane and 30 g of the solid catalyst component prepared in Example 1 (d). While maintaining the inner temperature of the autoclave at 15° C., 30 g of propylene was continuously fed over a period of 45 minutes to carry out a preliminary polymerization. The preliminary polymer slurry thus obtained was transferred to a SUS-made autoclave equipped with a stirrer and having a capacity of 150 liters, 100 liters of sufficiently purified liquefied butane was added, and the mixture was preserved while keeping it at a temperature not exceeding 10° C.
(f) Polymerization of Propylene
A slurry polymerization was carried out, using liquefied propylene as a medium. Thus, in a polymerization reactor equipped with a stirrer and having an inner volume of 300 liters, a continuous polymerization was carried out while feeding 57 kg/Hr of liquefied polypropylene, 50 mmoles/Hr of triethylaluminum (hereinafter referred to as TEA), 0.23 mmoles/Hr of cyclhexylethyldimethoxysilane (hereinafter referred to as CHEDMS), 0.53 mmoles/Hr of n-propylmethyldimethoxysilane (hereinafter referred to as nPMDMS) and 1.0 g/Hr of the preliminary polymer slurry prepared in Example 7 (e) as a solid catalyst component, feeding hydrogen gas so as to maintain the hydrogen concentration in the gas phase part of the polymerization reactor at 0.3%, keeping the polymerization temperature at 70° C. and withdrawing the polymer slurry so as to maintain a constant level of liquid surface in the polymerization reactor. As a result, 18.35 kg/Er of a powdery polymer was obtained. Yield of polymer per solid catalyst component (PP/cat) was 18,400 (g/g).

After adding an antioxidant to the powdery polymer, the polymer was granulated by means of an extruder to obtain a pellet. Table 2 illustrates the fundamental properties of the pellet.

Next, the polymer pellet was melted and extruded at 270° C. by means of a T-die extruder equipped with a screw of 65 mm diameter, and then rapidly cooled by means of cooling rolls of 30° C. to obtain a sheet. The sheet was longitudinally stretched while heating it at 145° C., then laterally stretched while heating it with hot air of 157° C., and then subjected to a stretch heat treatment at 165° C. to obtain a biaxially oriented film having a thickness of 20 μ. Table 3 illustrates properties of the film.

A pellet was prepared in the same manner as in Example 7, except that, in the polymerization of propylene, CHEDMS only was used in place of the combination of two electron donative compounds CHEDMS and nPMDMS and the feeding rate was altered to 0.95 mmole/Hr. Pentad stereoirregularity index (mmrr/mmmm) of 105° C. xylene-insoluble fraction of the pellet thus obtained was 0.0041.

A pellet was prepared in the same manner as in Example 7, except that, in the polymerization of propylene, nPMDMS only was used in place of the combination of two electron donative compounds CHEDMS and nPMDMS and the feeding rate was altered to 1.00 mmole/Hr. Pentad stereoirregularity index (mmrr/mmmm) of 105° C. xylene-insoluble fraction of the pellet thus obtained was 0.0080.

EXAMPLE 8

A pellet was prepared in the same manner as in Example 7, except that, in the polymerization of propylene of Example 7 (f), the feeding rates of CHEDMS and nPMDMS were both altered. Table 2 illustrates fundamental properties of the pellet obtained herein.

A biaxially oriented film was prepared therefrom by carrying out a stretching processing under the same conditions as in Example 7. Table 3 illustrates properties of the biaxially oriented film obtained herein.

EXAMPLE 9

A pellet was prepared in the same manner as in Example 7, except that, in the polymerization of propylene of Example 7 (f), the feeding rates of CHEDMS and nPMDMS were both altered. Table 2 illustrates fundamental properties of the pellet obtained herein.

A biaxially oriented film was prepared therefrom by carrying out a stretching processing under the same conditions as in Example 7. Table 3 illustrates properties of the biaxially oriented film obtained herein.

EXAMPLE 10

A pellet was prepared in the same manner as in Example 7, except that, in the polymerization of propylene of Example 7 (f), the feeding rates of CHEDMS and nPMDMS were both altered. Table 2 illustrates fundamental properties of the pellet obtained herein.

A biaxially oriented film was prepared therefrom by carrying out a stretching processing under the same conditions as in Example 7. Table 3 illustrates properties of the biaxially oriented film obtained herein.

EXAMPLE 11

A preliminary polymer slurry was prepared by repeating the procedures of (a) synthesis of organomagnesium compound, (b) synthesis of solid product, (c) synthesis of ester-treated solid, (d) synthesis of solid catalyst component (activating treatment) and (e) preliminary polymerization mentioned in Example 7.

(f) Polymerization of Propylene

In a fluidized bed type reactor equipped with a stirrer and having an inner volume of 1 m$^3$, a continuous gas phase polymerization of propylene was carried out at a polymerization temperature of 75° C. and at a polymerization pressure of 18 kg/cm$^2$G, while feeding propylene and hydrogen so as to maintain the hydrogen concentration in the gas phase part of the reactor at 0.1% together with 50 mmoles/Hr of TEA, 0.5 mmole/Hr of CHEDMS, 0.5 mmole/Hr of nPMDMS and 2.0 g/Hr of the preliminary polymer slurry prepared in (e) as a solid catalyst component. As a result, a powdery polymer was obtained.

The pellet thus obtained was granulated by means of an extruder under the same conditions as in Example 7 to obtain a pellet. Table 2 illustrates fundamental properties of the pellet obtained herein.

A biaxially oriented film was prepared therefrom by carrying out a stretching processing under the same conditions as in Example 7. Table 3 illustrates properties of the biaxially oriented film obtained herein.

Comparative Example 9

A pellet was prepared in the same manner as in Example 7, except that, in the polymerization of propylene of Example 7 (f), only CHEDMS was used in place of the combination of the two electron donative compounds CHEDMS and nPMDMS and the feeding rates were altered. Table 2 illustrates fundamental properties of the pellet obtained herein.

A biaxially oriented film was prepared therefrom by carrying out a stretching processing under the same conditions as in Example 7. Table 3 illustrates properties of the biaxially oriented film obtained herein.

Comparative Example 10

A pellet was prepared in the same manner as in Example 7, except that CHEDMS was used in place of the nPMDMS in the preliminary polymerization of Example 7 (e), nPMDMS only was used in place of the combination of CHEDMS and nPMDMS in the polymerization of propylene of Example 7 (f) and the feeding rates were altered. Table 2 illustrates fundamental properties of the pellet obtained herein.

A biaxially oriented film was prepared therefrom by carrying out a stretching processing under the same conditions as in Example 7. Table 3 illustrates properties of the biaxially oriented film obtained herein.

Comparative Example 11

A pellet was prepared in the same manner as in Example 11, except that, in the polymerization of propylene of Example 11 (f), CHEDMS only was used in place of the combination of two electron donative compounds CHEDMS and nPMDMS and the feeding rates were altered. Table 2 illustrates fundamental properties of the pellet obtained herein.

A biaxially oriented film was prepared therefrom by carrying out a stretching processing under the same conditions as in Example 7. Table 3 illustrates properties of the biaxially oriented film obtained herein.

Comparative Example 12

A pellet was prepared in the same manner as in Example 11, except that, in the polymerization of propylene of Example 11 (f), the feeding rates of CHEDMS and nPM-DMS were altered. Table 2 illustrates fundamental properties of the pellet obtained herein.

A biaxially oriented film was prepared therefrom by carrying out a stretching processing under the same conditions as in Example 7. Table 3 illustrates properties of the biaxially oriented film obtained herein.

Comparative Example 13

(a) Preparation of Reduced Product

After replacing the inner atmosphere of a reactor having a capacity of 200 liters with argon gas, 40 liters of dry hexane and 10 liters of titanium tetrachloride were charged. After adjusting temperature of the resulting solution to −5° C., a solution consisting of 30 liters of dry hexane and 23.2 liters of ethylaluminum sesquichloride was dropwise added thereto while maintaining the temperature of reaction system at −3° C. or below. Then, the mixture was stirred for 2 hours at that temperature. After the reaction, the reaction mixture was allowed to stand, and the resulting solid reduced product was separated from the liquid phase at 0° C. and twice washed with each 40 liters portion of hexane to obtain 16 kg of a reduced product.

(b) Preparation of Titanium Trichloride Composition

The reduced product obtained in (a) was made into a slurry in n-decalin. After adjusting the concentration of the slurry to 0.2 g/cc, the slurry was heated at 140° C. for 2 hours. After the reaction, the supernatant was withdrawn and twice washed with each 40 liters portion of hexane to obtain titanium trichloride composition (A).

(c) Preparation of Titanium Trichloride Solid Catalyst

Eleven kilograms of the titanium trichloride composition (A) obtained in (b) was made into a slurry in 55 liters of toluene. Then, iodine and isoamyl ether were added thereto so that the molar ratio of titanium trichloride composition (A)/iodine/diisoamyl ether came to 1/0.1/1.0, after which the resulting mixture was reacted at 80° C. for one hour to obtain titanium trichloride solid catalyst (B).

(d) Polymerization of Propylene

After sufficiently replacing the inner atmosphere of a reactor equipped with a stirrer and having a capacity of 200 liters with propylene gas, 68 liters of heptane and 13.6 kg of propylene were charged. After heating the reactor to 60° C., propylene and hydrogen were fed so that the total pressure reached 10 kg/cm2G and the hydrogen concentration in gas phase reached 0.5% by mole. Then, 3.1 kg of the above-obtained titanium trichloride solid catalyst (B), 25 g of diethylaluminum chloride (DEAC) and 0.47 g of ε-caprolactone as an electron donative compound were charged and rinsed into the reactor with 2 liters of heptane to start a polymerization. Thereafter, the polymerization was continued for 8 hours by continuously feeding the monomer while maintaining the temperature, pressure and composition of gas phase constant. After stopping the polymerization by addition of isobutanol, 70 liters of heptane having a temperature of 60° C. was added and stirred for 30 minutes. By separating the powdery product by centrifugation and drying the product, 26.5 kg of a dry powdery polymer was obtained. Subsequently, the powdery polymer was pelletized in the same manner as in Example 7. Table 1 illustrates fundamental properties of the pellet obtained herein. Pentad stereoirregularity index (mmrr/mmmm) of the 105° C. xylene-insoluble fraction of the pellet was 0.0041. Then, the pellet was made into a biaxially oriented film by a stretching processing under the same conditions as in Example 7. Table 3 illustrates the properties of the biaxially oriented film obtained herein.

TABLE 1

| | Conditions of polymerization | | | | | | Results of polymerization | | | | | |
|---|---|---|---|---|---|---|---|---|---|---|---|---|
| | Electron donative compound (Donor) | | Donor/TEA (molar ratio) | | Total donor/ TEA (molar ratio) | TEA in propylene (wt ppm) | PP/Cat (g/g) | CXS (wt %) | B.D. [η] | IL (g/ml) | mmrr/ (wt %) | 105° C. xylene-insoluble fraction mmmm (wt. %) |
| | (α) | (β) | (α) | (β) | | | | | | | | |
| Ex 1 | CHEDMS | nPMDMS | 0.025 | 0.025 | 0.050 | 380 | 29,200 | 1.6 | 1.77 | 0.41 | 99.1 | 0.0060 | 78.5 |
| Ex 2 | CHEDMS | nBMDMS | " | " | " | " | 30,500 | 1.5 | 1.94 | 0.41 | 99.3 | 0.0046 | 71.0 |
| Ex 3 | CHEDMS | nHMDMS | " | " | " | " | 27,800 | 1.5 | 1.95 | 0.41 | 99.4 | 0.0045 | 72.7 |
| Ex 4 | DCPDMS | nPMDMS | " | " | " | " | 35,400 | 1.1 | 2.34 | 0.41 | 99.4 | 0.0031 | 80.6 |
| C.Ex 1 | CHEDMS | — | 0.050 | — | 0.050 | " | 28,600 | 1.3 | 1.84 | 0.41 | 99.3 | 0.0026 | 74.6 |
| C.Ex 2 | DCPDMS | — | 0.050 | — | 0.050 | " | 31,700 | 1.0 | 2.55 | 0.41 | 99.5 | 0.0025 | 84.7 |
| C.Ex 3 | — | nPMDMS | — | 0.050 | 0.050 | " | 25,200 | 4.8 | 1.43 | 0.39 | 95.1 | 0.0110 | 25.5 |
| C.Ex 4 | — | nBMDMS | — | 0.050 | 0.050 | " | 21,000 | 6.0 | 1.28 | 0.39 | 90.8 | 0.0100 | 28.4 |
| C.Ex 5 | — | nHMDMS | — | 0.050 | 0.050 | " | 18,300 | 5.0 | 1.42 | 0.39 | 93.9 | 0.0090 | 15.2 |
| C.Ex 6 | CHEDMS | — | 0.025 | — | 0.025 | " | 29,600 | 2.6 | 1.68 | 0.41 | 98.7 | 0.0040 | 72.8 |
| C.Ex 7 | — | nPMDMS | — | 0.025 | 0.025 | " | 22,000 | 11.7 | 1.22 | 0.37 | 79.6 | 0.0112 | 25.1 |
| C.Ex 8 | — | nPMDMS | — | 0.100 | 0.100 | " | 19,300 | 2.6 | 1.64 | 0.40 | 98.1 | 0.0104 | 21.0 |
| Ex 5 | CHEDMS | nPMDMS | 0.010 | 0.025 | 0.035 | " | 33,000 | 3.0 | 1.60 | 0.41 | 98.2 | 0.0056 | 62.4 |
| Ex 6 | CHEDMS | nPMDMS | 0.010 | 0.025 | 0.035 | 200 | 25,700 | 7.0 | 1.45 | 0.39 | 92.3 | 0.0070 | 43.1 |

Ex: Example
C.Ex: Comparative Example

TABLE 2

| | | Conditions of polymerization | | | | | Results of polymerization | | |
|---|---|---|---|---|---|---|---|---|---|
| | Solid catalyst component | Electron donative compound | | Electron donative comd./Organo-aluminum (molar ratio) | | Total electron donative component/ Organoaluminum (molar ratio) | 23° C. decalin-soluble fraction (wt %) | T1 (° C.) | MFR (g/ 10 min) |
| | | (α) | (β) | (α) | (β) | | | | |
| Ex-7 | Ex-7 (d) | CHEDMS | nPMDMS | 0.0046 | 0.0106 | 0.0152 | 6.3 | 146.8 | 2.2 |
| Ex-8 | Ex-7 (d) | CHEDMS | nPMDMS | 0.0030 | 0.0070 | 0.0100 | 6.9 | 145.6 | 2.6 |
| Ex-9 | Ex-7 (d) | CHEDMS | nPMDMS | 0.0472 | 0.0491 | 0.0963 | 3.9 | 147.2 | 1.7 |
| Ex-10 | Ex-7 (d) | CHEDMS | nPMDMS | 0.0023 | 0.0464 | 0.0490 | 6.5 | 140.7 | 2.6 |
| Ex-11 | Ex-7 (d) | CHEDMS | nPMDMS | 0.0100 | 0.1000 | 0.0200 | 8.1 | 141.6 | 2.6 |
| C.Ex-9 | Ex-7 (d) | CHEDMS | — | 0.1000 | — | 0.1000 | 3.2 | 150.8 | 1.3 |
| C.Ex-10 | Ex-7 (d) | — | nPMDMS | — | 0.0198 | 0.0198 | 9.7 | 134.1 | 3.4 |
| C.Ex-11 | Ex-7 (d) | CHEDMS | — | 0.1000 | — | 0.1000 | 2.4 | 148.7 | 2.3 |
| C.Ex-12 | Ex-7 (d) | CHEDMS | nPMDMS | 0.0048 | 0.0048 | 0.0096 | 10.5 | 136.5 | 2.6 |
| C.Ex-13 | C.Ex-13 (c) | ε-caprolactone | | 0.0200 | | 0.0200 | 2.6 | 148.7 | 1.3 |

CHEDMS: Cyclohexylethyldimethoxysilane
nPMDMS: n-Propylmethyldimethoxysilane
Ex: Example
C.Ex: Compartive Example

| | Film properties | | | |
|---|---|---|---|---|
| | Haze | Young's modulus (kg/cm$^2$) | | Stretch-ability |
| | (%) | MD | TD | |
| Ex - 7 | 0.3 | 18800 | 36400 | ○ |
| Ex - 8 | 0.3 | 17700 | 34300 | ○ |
| Ex - 9 | 0.6 | 19900 | 37900 | ○ |
| Ex - 10 | 0.3 | 17100 | 32700 | ○ |
| Ex - 11 | 0.3 | 17500 | 34700 | ○ |
| C. Ex - 9 | 1.1 | 18900 | 32200 | × |
| C. Ex - 10 | 0.4 | 15200 | 28600 | ○ |
| C. Ex - 11 | 1.0 | 20000 | 38200 | × |
| C. Ex - 12 | 0.3 | 15500 | 30900 | ○ |
| C. Ex - 13 | 0.6 | 19400 | 39300 | × |

Ex: Example
C. Ex: Comparative Example

The present invention provides a novel process for producing a novel, well-balanced olefin polymer excellent in stiffness and heat-resistance which are both the original characteristic features of a highly stereospecific polypropylene, and at the same time excellent in processability, by the use of an olefin-polymerizing catalyst capable of forming a polypropylene of novel composition, and an olefin-polymerizing catalyst for use in said process. Further, the polypropylene for use in production of a biaxially oriented film provided by the present invention has an excellent stretchability, and a film obtained by the stretching processing of said polypropylene has excellent transparency and stiffness simultaneously and is successfully usable as a packaging material, etc.

What is claimed is:

1. A catalyst system for polymerizing olefins formed from the constituents comprising:

(A) a solid catalyst component containing magnesium, titanium, halogen and electron donative compound as essential components, wherein the electron donative compound contained in the solid catalyst component (A) is selected from the group consisting of esters of organic and inorganic acids and ethers, wherein the esters of organic acids are esters of mono-carboxylic acids or poly-carboxylic acids;

wherein the ether is at least a dialkyl ether compound represented by the following general formula:

wherein $R^4$, $R^5$, $R^6$ and $R^7$ each represents a linear or branched alkyl group having 1–20 carbon atoms, an alicyclic group, an aryl group, an alkylaryl group or an arylalkyl group provided that $R^4$ to $R^7$ can be identical with or different from one another, and that each of $R^4$ and $R^5$ can be a hydrogen atom; and wherein the ester of an inorganic acid is at least one silicon compound represented by the following general formula:

$$R^2{}_n Si(OR^3)_{4-n}$$

wherein $R^2$ represents a hydrocarbon group having 1–20 carbon atoms or a hydrogen atom, $R^3$ represents a hydrocarbon group having 1–20 carbon atoms and n represents a number satisfying $0 \leq n \leq 4$, (B) an organoaluminum compound, and (C) at least two electron donative compounds including electron donative compound (α) and electron donative compound (β), wherein the electron donative compound (α) is an organic silicon compound represented by the following formula:

$$R^{13}R^{14}Si(OR^{15})_2,$$

wherein $R^{13}$ represents a hydrocarbon group in which the carbon atom adjacent to Si is a secondary or tertiary carbon atom wherein $R^{13}$ is selected from the group consisting of cyclopentyl, cyclohexyl, cyclopentenyl phenyl and tolyl and each of $R^{14}$ and $R^{15}$ independently represents a $C_1$–$C_{20}$ hydrocarbon group, and wherein the electron donative compound (β) is an organic silicon compound represented by the following formula:

$R^{16}R^{17}Si(OR^{18})_2,$ wherein $R^{16}$ represents a straight chain alkyl group selected from the group consisting of propyl, butyl and hexyl, $R^{17}$ represents a hydrocarbon group having one carbon atom and $R^{18}$ represents a $C_1$–$C_5$ hydrocarbon group; and wherein the total amount of electron donative compounds (C) is present in an amount of from 0.01 to 1 mole per mole of compound (B).

2. The catalyst system according to claim 1, wherein the solid catalyst component is produced by the method of reducing an alkoxytitanium compound in the presence of an organic silicon compound having a Si—O bond to obtain a solid product followed by treating said solid product with an ester compound, an ether compound and titanium tetrachloride.

3. The catalyst system according to claim 1, wherein $R^{15}$ in the electron donative compound (α) represents $C_1$–$C_5$ hydrocarbon group.

4. The catalyst system of claim 1 wherein $R^{13}$ represents cyclohexyl.

5. The catalyst system of claim 1 wherein $R^{14}$ represents straight chain alkyl groups, cycloalkyl groups, cycloalkenyl groups or aryl groups.

6. The catalyst system of claim 1 wherein $R^{14}$ represents methyl, ethyl, propyl, butyl, or pentyl.

7. The catalyst system of claim 1 wherein the electron donative compound (β) is n-propylmethyldimethoxysilane, n-butylmethyldimethoxysilane or n-hexylmethyldimethoxy silane.

8. The catalyst system of claim 1 wherein the catalyst system is a propylene-polymerization catalyst.

9. A catalyst system for polymerizing olefins formed from the constituents comprising:

(A) a solid catalyst component containing magnesium titanium, halogen and electron donative compound as essential components, wherein the electron donative compound contained in the solid catalyst component (A) is selected from the group consisting of esters of organic and inorganic acids and ethers, wherein the esters of organic acids are esters of mono-carboxylic acids or poly-carboxylic acids;

wherein the ether is at least a dialkyl ether compound represented by the following general formula:

wherein $R^4$, $R^5$, $R^6$ and $R^7$ each represents a linear or branched alkyl group having 1–20 carbon atoms, an alicyclic group, an aryl group, an alkylaryl group or an arylalkyl group provided that $R^4$ to $R^7$ can be identical with or different from one another, and that each of $R^4$ and $R^5$ can be a hydrogen atom; and wherein the ester of an inorganic acid is at least one silicon compound represented by the following general formula:

$R^2{}_n Si(OR^3)_{4-n}$ wherein $R^2$ represents a hydrocarbon group having 1–20 carbon atoms or a hydrogen atom, $R^3$ represents a hydrocarbon group having 1–20 carbon atoms and n represents a number satisfying $0 \leq n \leq 4$, (B) an organoaluminum compound, and (C) at least two electron donative compounds including electron donative compound (α) and electron donative compound (β), wherein the electron donative compound (α) is an organic silicon compound represented by the following formula:

$R^{13}R^{14}Si(OR^{15})_2,$ wherein $R^{13}$ represents a hydrocarbon group in which the carbon atom adjacent to Si is a secondary or tertiary carbon atom wherein $R^{13}$ is selected from the group consisting of cyclopentyl, cyclohexyl, cyclopentenyl, phenyl and tolyl and each of $R^{14}$ and $R^{15}$ independently represents a $C_1$–$C_{20}$ hydrocarbon group, and wherein the electron donative compound (β) is an organic silicon compound represented by the following formula:

$R^{16}R^{17}Si(OR^{18})_2,$ wherein $R^{16}$ represents a straight chain alkyl group selected from the group consisting of methyl, ethyl, propyl, butyl, pentyl or hexyl, $R^{17}$ represents a hydrocarbon group having one carbon atom and $R^{18}$ represents a $C_1$–$C_5$ hydrocarbon group; and wherein the total amount of electron donative compounds (C) is present in an amount of from 0.01 to 1 mole per mole of compound (B).

10. The catalyst system of claim 9 wherein $R^{13}$ represents cyclohexyl and $R^{14}$ represents methyl, ethyl, propyl, butyl, or pentyl.

* * * * *